Patented July 25, 1950

2,516,682

UNITED STATES PATENT OFFICE 2,516,682

METHOD OF PRODUCING STREPTOMYCIN

Richard Donovick, New York, N. Y., and Walter L. Koerber, Kingston, and Geoffrey W. Rake, Milltown, N. J., assignors to E. R. Squibb & Sons, New York, N. Y., a corporation of New York No Drawing. Application March 23, 1946, Serial No. 656,560

7 Claims. (Cl. 195—80)

This application is a continuation-in-part of application Serial No. 592,914, filed May 9, 1945, now abandoned.

This invention relates to antibiotic substances.

Prior to this invention it had been disclosed: (1) that a potent antibiotic substance, streptomycin, was present in the culture liquid obtained when the organism *Actinomyces griseus* was grown in contact with (i. e., in or on) certain liquid media; (2) that the composition of the medium in which the organism was grown was of considerable importance in the production of the antibiotic substance; and (3) that the presence of peptone (or other protein hydrolyzate, such as tryptone) and of a specific growth-promoting substance supplied by meat extract (or corn-steep liquor) was required for the production of the antibiotic substance (Schatz, Bugie, and Waksman, Proc. Soc. Exp. Biol. and Med., 1944, 55, 66). In practice, however, it was found that (certain constituents of) the protein hydrolyzate and/or meat extract complicated the isolation of the antibiotic substance, and that the use of media containing these substances was for this and other reasons undesirable. Also, it was found that, on use of corn-steep liquor as the substantially sole source of the nitrogenous and growth-promoting substances of the medium, practically no antibiotic substance was formed.

It is the object of this invention to provide a highly-active, streptomycin-like, antibiotic substance, and methods of obtaining it; and it is a further object to provide improved methods of producing an antibiotic substance.

[Inasmuch as the nature of the medium in which an organism is grown may qualitatively affect the antibiotic substance produced, and a different medium is employed in the practice of this invention, it is possible that the antibiotic substance produced in accordance with this invention differs qualitatively from the streptomycin produced by Schatz et al. (loc. cit.). Accordingly, the antibiotic substance produced in accordance with this invention is herein referred to as "streptomycin-like," even though it may in fact be streptomycin or a derivative thereof. Furthermore, though the antibiotic substance produced in accordance with this invention is referred to in the singular, it should be understood that it may comprise more than one compound.]

It has been found that certain (vegetable) meals, flours, meal-infusions, and flour-infusions can be employed as the sole source of nitrogenous and growth-promoting substances for *Actinomyces griseus*, thus rendering unnecessary the use of the protein hydrolyzate and meat extract (and obviating the attendant disadvantages), and that the substitution of such meal, flour, meal-infusion or flour-infusion for the peptone (or tryptone) and meat-extract (or corn-steep liquor) components of the prior media does not impair (but generally materially increases) the efficiency of the antibiotic-substance production.

The following meals (and the corresponding flours, meal-infusions and flour-infusions) are utilizable in the practice of this invention: bean meals (the meals of soybean, castor bean, jack beans, and Lima beans, inter alia); peanut meal, cottonseed meal, and linseed (flaxseed) meal.

The method of this invention essentially comprises growing the organism *Actinomyces griseus* in or on a liquid nutrient medium whose substantially sole source of nitrogenous and growth-promoting substances is such meal, flour, meal-infusion or flour-infusion (especially a bean meal, bean flour, bean-meal-infusion, or bean-flour infusion, notably soybean meal); and the compositions of this invention essentially comprise the highly-active, streptomycin-like, antibiotic substance formed as a result of this growth. That antibiotic substance is present in both the liquid and the solids (mycelia, spores, and other sedimentable solids) of such culture; and it may be recovered from the solids by extraction with an aqueous acid, this recovery (and the antibiotic substance obtained thereby) being the subject-matter of Rake, Koerber, and Donovick application Serial No. 586,824, filed April 5, 1945, now Patent No. 2,461,922, dated Feb. 15, 1949.

The antibiotic-containing culture liquid and/or the extract of the culture solids may be used or further treated as a streptomycin-containing culture liquid; or these liquids may be treated (either separately or together) by the process described in Wintersteiner and Fried application Serial No. 590,974, filed April 28, 1945, now abandoned, to obtain a streptomycin-like antibiotic substance in highly-purified or substantially-pure form.

This invention is applicable to growth of the organism *Actinomyces griseus* in or on such liquid nutrient medium; i. e., to both stationary and submerged culture, the latter being preferred because it is more rapid and better adapted for large-scale production.

The advantages of this invention may be gained even though another source (or sources) of nitrogenous and/or growth-promoting substances is included in the medium along with such meal, flour, meal-infusion or flour-infusion, as long as such other source is in such small proportion as not to complicate the isolation of the streptomycin-like antibiotic substance. Preferably, such meal, flour, meal-infusion or flour-infusion should be the sole source of the nitrogenous and growth-promoting substances in the medium.

The terms "meal," "flour," and "infusion" are employed herein in their commonly accepted sense. Thus, a bean "meal" is a product obtained by coarsely-grinding beans and removing all or part of the oil. [The oil may be removed by expression (i. e., expelled by crushing) or by extraction with organic solvents.] The term "flour" designates a product obtained by finely-grinding a meal; and the term "infusion" designates an aqueous extract, obtained, for example, by cooking a meal or a flour in water, and filtering. The terms "meal" and "flour" are intended to comprehend the purified forms of such products; but the unpurified forms are preferred from the standpoint of the efficiency of the antibiotic substance production.

The proportion of such meal, flour, meal-infusion or flour-infusion (on a dry basis) may vary between relatively wide limits, but advantageously is about 0.5–2.5% of the medium.

The liquid nutrient media employed in the practice of this invention must of course also contain a nutrient salt and a carbohydrate assimilable by the organism. The utilizable nutrient salts are illustrated by (the preferred) sodium chloride and sodium sulfate; but a number of other conventional nutrient salts or combinations may be employed (sodium chloride plus magnesium chloride, and sodium chloride plus sodium sulfate, inter alia). Similarly, the utilizable carbohydrates are illustrated by (the preferred) dextrose; but other carbohydrates assimilable by *Actinomyces griseus* (potato starch, for example) may be employed. The proportion of the preferred carbohydrate (dextrose) is advantageously about 0.5–3.0% of the medium.

Media of the type employed for the production of the streptomycin-like antibiotic substance in accordance with this invention may advantageously be employed for the production of an *Actinomyces griseus* spore inoculum. Thus, the growth of *Actinomyces griseus* on a liquefiable solid medium whose substantially sole source of nitrogenous and growth-promoting substances is such meal, flour, meal-infusion or flour-infusion provides an excellent spore inoculum for the production of the streptomycin-like antibiotic substance. Such a medium may be obtained, for example, by boiling a 2% aqueous suspension of soybean meal, filtering, and adding to the filtrate 0.2–1% dextrose, 0.5% sodium chloride, and (desirably) 2% agar.

The following examples are illustrative of the invention (the potency unit referred to being derived from the amount of streptomycin required to inhibit completely the multiplication of 500–1000 cells of *K. pneumoniae* growing under standardized conditions in a culture medium containing 1% tryptone; one unit being equivalent to one gamma of free streptomycin base):

*Example 1*

100 ml. of an aqueous medium containing 1.0% soybean meal (expeller method), 1.0% dextrose (anhydrous), and 0.5% sodium chloride is placed in a 500 ml. Erlenmeyer flask and sterilized. The sterilized medium (whose pH is 6.2) is then inoculated with 0.5 ml. of an *Actinomyces griseus* spore suspension, and incubated at 24° C. on a shaking machine (100 strokes per minute). After six days, the culture (whose potency is 265 units/ml.) is centrifuged; and the supernate is used or further treated as a streptomycin-containing culture liquid.

*Example 2*

800 gal. of an aqueous medium containing 1.5% soybean meal (expeller method), 1.0% dextrose (anhydrous), and 0.5% sodium chloride in a 1300 gal. tank is sterilized, and inoculated with 2 liters of an *Actinomyces griseus* spore suspension; and the inoculated medium is incubated at 25° C. under a pressure of 3–5 lbs. (an average of 0.9 cu. ft. air/gal. medium/hour being passed through the medium) while stirring (at a rate of 130 R. P. M.). After 78 hours incubation, the culture (whose potency is 173 units/ml.) is centrifuged; and the supernate is used or further treated as a streptomycin-containing culture liquid.

*Example 3*

(a) 400 gal. of an aqueous medium containing 1.5% soybean meal, 1.0% dextrose, and 0.5% sodium chloride in a 1300 gal. tank is sterilized and inoculated with a mixture of spores and mycelium of *Actinomyces griseus*, and the inoculated medium is incubated at 25° C. under a pressure of 10–15 lbs. (an average of 4.50 cu. ft. air/gal. medium/hour being passed through the medium) while stirring (at at rate of 130 R. P. M.).

(b) After 100 hours incubation, a 100 ml. portion of the culture (which has a potency of 27.6 units/ml.) is adjusted to pH 3.5 by adding 37% hydrochloric acid, and the acidified culture is stirred for 24 hours at 4° C. The culture (whose potency is raised by this treatment to 38.6 units/ml.) is centrifuged; and the supernate is used or further treated as a streptomycin-containing culture liquid.

*Example 4*

(a) The culture described in Example 3 (a) after incubation for 100 hours and removal of the 100 ml. portion referred to in section (b) of Example 3, is centrifuged. [The supernate is used or further treated as a streptomycin-containing culture liquid.] The sediment is collected and washed with two 1-liter portions of distilled water by centrifugation. [The washings have a potency of less than 4.5 units/ml., and may therefore be discarded.] To the washed sediment is added 1 liter distilled water, and the mixture is stirred to form a homogeneous heavy slurry containing about 3.7 mg. solids per ml.

(b) A 50 ml. portion of the slurry obtained in the foregoing section is adjusted to pH 2.15 with 5-normal sulfuric acid, and the mixture is stirred at 50° C. for an hour. The mixture is then centrifuged; and the clear supernate (extract), whose potency is 96.2 units/ml. (representing a recovery of 25.8 units/mg. of the dried solids), is used or further treated as a streptomycin-containing culture liquid.

*Example 5*

Using an aqueous medium containing 1.5% soybean meal (expeller method), 1.0% dextrose (anhydrous), and 0.5% sodium sulfate in place of the medium in Example 1, and under the same conditions, a culture liquid of the same potency (265 units/ml.) is obtained.

*Example 6*

Using an aqueous medium containing 1.5% soybean meal (expeller method), 0.5% dextrose (anhydrous), and 0.5% sodium chloride in place of the medium in Example 1, and under the same conditions except that the incubation is extended to 7 days, the culture liquid obtained has a potency of 192 units/ml.

*Example 7*

100 ml. of an aqueous (distilled water) medium containing 0.6% peanut meal, 3.0% dextrose (anhydrous), and 0.5% sodium chloride is placed in a 500 ml. Erlenmeyer flask and sterilized. The sterilized medium is then inoculated with 5 ml. of an *Actinomyces griseus* inoculum (described hereinafter), and incubated at 24–25° C. on an oscillating shaking machine (105–110 strokes per minute). After 3 days, the culture has a potency of 137 units/ml. After 6 days, the culture (whose potency is 206 units/ml.) is centrifuged; and the supernate is used as such or further treated as a streptomycin-containing culture liquid.

Using 0.6% of a peanut meal obtained from another source, and under the same conditions except that the incubation was extended to 7 days, a culture liquid having a potency of 310 units/ml. was obtained.

The inoculum is a 48-hour-old mycelium obtained by inoculating 100 ml. of a standard soybean meal medium (cf. Example 1) with 0.5 ml. of a spore suspension of *Actinomyces griseus*.

Example 8

Using 0.6% of cottonseed meal in place of the peanut meal in Example 7, and under the same conditions, a culture liquid having a potency of 128 units/ml. is obtained.

Example 9

Using 0.6% linseed meal in place of the peanut meal in Example 7, and under the same conditions, a culture liquid having a potency of 111 units/ml. is obtained.

Example 10

Using 0.6% castor bean meal (castor pomace) in place of the peanut meal in Example 7, and under the same conditions except that the incubation is extended to 7 days, a culture liquid having a potency of 237 units/ml. is obtained.

Example 11

(a) 1100 gal. of an aqueous (tap water) medium containing 2.25% soybean meal, 1.62% Cerelose hydrated (dextrose), 0.75% NaCl, and 180 g. NaOH is placed in a 1300-gal. carbon-steel fermentation tank equipped with a stirrer and air sparger; and the tank is sterilized for one hour at 120° C. When the temperature reaches 25° C., 50 gal. of an *Actinomyces griseus* inoculum (described hereinafter) is added; and the inoculated medium is incubated at 25° C. under a pressure of 3–6 lbs. per square inch (an average of 1 cu. ft. air/gal. medium/hour being passed through the medium) while stirring (at a rate of 120 R. P. M.). During the incubation, 5.6 liters of a 3% solution of octadecanol in lard oil is added dropwise as an antifoam agent.

The inoculum is a 50-hour-old mycelium obtained with a standard soybean-meal medium (cf. Example 1) in a 100 gal. carbon-steel tank, by sterilizing, inoculating with a spore suspension of *Actinomyces griseus*, and incubating under the conditions described in the preceding paragraph.

(b) After 89 hours incubation, a potency of 195 units/ml. is reached in the culture (whose pH is 6.7); the pH is adjusted to 1.5 with concentrated sulfuric acid, and 2% Celite No. 503 and 0.5% Darco G-60 are added, as filter aids; and the mixture is filtered through a filter press. The filtrate (having a potency of 230 units/ml.) is used as such or further treated as a streptomycin-containing culture liquid.

The invention may be variously otherwise embodied within the scope of the appended claims.

We claim:

1. The method of producing streptomycin which comprises growing the organism *Actinomyces griseus* in contact with a liquid nutrient medium whose substantially sole source of nitrogenous and growth-promoting substances is a member of the group consisting of the meals, flours, meal-infusions and flour-infusions of beans, peanuts, cottonseed, and linseed.

2. The method of producing streptomycin which comprises growing the organism *Actinomyces griseus* in contact with a liquid nutrient medium whose substantially sole source of nitrogenous and growth-promoting substances is a bean meal.

3. The method of producing streptomycin which comprises growing the organism *Actinomyces griseus* in contact with a liquid nutrient medium whose substantially sole source of nitrogenous and growth-promoting substances is soybean meal.

4. The method of producing streptomycin which comprises growing the organism *Actinomyces griseus* in contact with a liquid nutrient medium essentially comprising a nutrient salt, a carbohydrate assimilable by the organism, and soybean meal as the substantially sole source of the nitrogenous and growth-promoting substances in the medium.

5. The method of producing streptomycin which comprises growing the organism *Actinomyces griseus* in submerged culture in a liquid nutrient medium whose substantially sole source of nitrogenous and growth-promoting substances is a member of the group consisting of the meals, flours, meal-infusions and flour-infusions of beans, peanuts, cottonseed, and linseed.

6. The method of producing streptomycin which comprises growing the organism *Actinomyces griseus* in contact with a liquid nutrient medium whose substantially sole source of nitrogenous and growth-promoting substances is about 0.5–2.5% soybean meal.

7. The method of producing streptomycin which comprises growing the organism *Actinomyces griseus* in contact with a liquid nutrient medium essentially comprising a nutrient salt, about 0.5–3.0% dextrose, and about 0.5–2.5% soybean meal as the substantially sole source of the nitrogenous and growth-promoting substances of the medium.

RICHARD DONOVICK.
WALTER L. KOERBER.
GEOFFREY W. RAKE.

REFERENCES CITED

The following references are of record in the file of this patent:

UNITED STATES PATENTS

| Number | Name | Date |
|---|---|---|
| 2,051,017 | Schwarz | Aug. 11, 1936 |

OTHER REFERENCES

McMahon, Jour. Bact., April 1944, pp. 400–401.

Schatz et al., Proc. Soc. Exptl. Biol., "Streptomycin," Jan. 1944, pages 66–69.

Woodruff et al., Arch. Biochem., "Microbiological Aspects of Streptothricin," Aug. 1943, Abstract by E. R. Squibb, page 96.

Waksman, Soil Science, vol. 8, 1919, page 71.

Foster, J. Bact., vol. 51 #4, April 1946, page 474.